US012266886B2

(12) United States Patent
Shimomaki

(10) Patent No.: US 12,266,886 B2
(45) Date of Patent: Apr. 1, 2025

(54) CONNECTOR ASSEMBLY AND WATERPROOF CAP

(71) Applicant: Japan Aviation Electronics Industry, Limited, Tokyo (JP)

(72) Inventor: Yuta Shimomaki, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 374 days.

(21) Appl. No.: 17/955,201

(22) Filed: Sep. 28, 2022

(65) Prior Publication Data

US 2023/0155318 A1 May 18, 2023

(30) Foreign Application Priority Data

Nov. 12, 2021 (JP) ................................ 2021-184873

(51) Int. Cl.
*H01R 13/52* (2006.01)

(52) U.S. Cl.
CPC ..... *H01R 13/5213* (2013.01); *H01R 13/5216* (2013.01)

(58) Field of Classification Search
None
See application file for complete search history.

(56) References Cited

U.S. PATENT DOCUMENTS 5,573,412 A * 11/1996 Anthony ............ H01R 13/6397 220/242
6,227,717 B1 5/2001 Ott et al.
8,979,554 B2 * 3/2015 Yudate ............... H01R 13/5202 439/732
2012/0181317 A1 * 7/2012 Evens .................. G06F 1/1626 224/576
2017/0264042 A1 9/2017 Lueckemeier
2021/0167544 A1 * 6/2021 Hsu ........................ H01R 43/24

FOREIGN PATENT DOCUMENTS

CN 101499582 B 5/2011
CN 102055110 B 10/2012
CN 110299627 A 10/2019
CN 111916947 A * 11/2020 ........... H01R 13/502
CN 112467449 B * 5/2023 ......... H01R 13/5213
DE 10 2014 113 324 A1 3/2016
JP 2009043773 A 2/2009
JP 2013098078 A 5/2013
JP 5925938 B1 5/2016

* cited by examiner

*Primary Examiner* — Tho D Ta
(74) *Attorney, Agent, or Firm* — MUNCY, GEISSLER, OLDS & LOWE, P.C.

(57) ABSTRACT

A connector assembly includes a connector, a housing having an insertion port, and a waterproof cap detachably attached to the housing to close the insertion port, the waterproof cap having a cap body, a first protruding portion continuously surrounding an entire periphery of an outer peripheral surface of the cap body, and a second protruding portion disposed on a front end side of the cap body in a fitting direction from a position at which the first protruding portion is disposed, when the waterproof cap is attached to the housing, the first protruding portion being press-fitted to the insertion port and contacting an entire periphery of an inner peripheral surface of the insertion port while being elastically compressed, the second protruding portion being inserted into the connector and contacting at least two inner surfaces of the connector facing each other while being elastically compressed.

15 Claims, 6 Drawing Sheets

CONNECTOR ASSEMBLY AND WATERPROOF CAP

BACKGROUND OF THE INVENTION

The present invention relates to a connector assembly, particularly to a connector assembly in which a waterproof cap closes an insertion port of a housing of an electronic device, into which insertion port, a counter connector is inserted in a fitting process with a connector.

The present invention also relates to a waterproof cap that is detachably attached to a housing of an electronic device and closes an insertion port.

Conventionally, there have been known a structure in which, in an electronic device in which a connector for connection with an external device is provided in a housing, and an insertion port for inserting a counter connector is formed near the connector in the housing, a cap covers the insertion port of the housing in order to prevent water from entering from the outside to the inside of the housing when the connector is not used.

For example, JP 2013-98078 A discloses a mobile terminal in which an insertion port 2 is provided to a housing 1, and a connector 3 is disposed on the inner side from the insertion port 2 as shown in FIG. 14. A counter connector (not shown) is inserted into the insertion port 2 and fitted with the connector 3, whereby the counter connector can be connected to an external device (not shown) via the connector 3. The insertion port 2 includes an opening portion 2A of rectangular shape exposed on a front surface of the housing 1 and a communication hole 2B of oval shape continuing from the opening portion 2A and extending to the inside of the housing 1.

For waterproofing, a lid member 4 shown in FIG. 15 is detachably attached to the insertion port 2. The lid member 4 includes a front plate portion 4A of rectangular shape covering the opening portion 2A of the insertion port 2 and an insertion portion 4B formed on and protruding from an inner surface of the front plate portion 4A and inserted into the communication hole 2B of the insertion port 2. A recessed portion 5 is formed over an entire periphery of the insertion portion 4B, and a pair of claw portions 6 are separately formed on opposite end portions of the insertion portion 4B in a longitudinal direction.

As shown in FIG. 16, when an O-ring 7 is fitted in the recessed portion 5, and the insertion portion 4B is inserted into the communication hole 2B of the housing 1, the O-ring 7 contacts an inner peripheral surface 2C of the communication hole 2B while being pressurized by the inner peripheral surface 2C, whereby water is stopped at the insertion port 2. Further, the claw portion 6 is inserted toward the inner side of the housing 1 than the inner peripheral surface 2C of the communication hole 2B, and caught by an edge portion 8 formed on the inner side of the inner peripheral surface 2C of the communication hole 2B, resulting in prevention of the lid member 4 from falling off the insertion port 2.

When the lid member 4 is attached to or detached from the insertion port 2, in order to prevent a situation where the claw portion 6 scratches the inner peripheral surface 2C of the communication hole 2B so that the inner peripheral surface 2C is chipped away, and a water stop effect by the O-ring 7 deteriorates, the edge portion 8 catching the claw portion 6 is formed to protrude toward the inner side of the housing 1 than the inner peripheral surface 2C of the communication hole 2B and toward the center side of the communication hole 2B from the inner peripheral surface 2C.

However, in order to prevent the lid member 4 from falling off the insertion port 2, the pair of claw portions 6 of the lid member 4 need to be inserted to the inner side of the housing 1 than the inner peripheral surface 2C of the communication hole 2B and caught by the edge portion 8, and in order to prevent the claw portions 6 from scratching the inner peripheral surface 2C of the communication hole 2B, the edge portion 8 needs to be formed to protrude toward the inner side of the housing 1 than the inner peripheral surface 2C of the communication hole 2B and toward the center side of the communication hole 2B from the inner peripheral surface 2C, and there is a problem in that the configuration of the insertion port 2 of the housing 1 and the lid member 4 becomes complicated.

Further, there is also a problem in that a space where the claw portion 6 is caught by the edge portion 8 needs to be provided between the insertion port 2 of the housing 1 and the connector 3.

SUMMARY OF THE INVENTION

The present invention has been made to overcome such conventional problems and aims at providing a connector assembly with a simple structure, without the need for a large space, and capable of preventing water from penetrating from an insertion port of a housing of an electronic device.

The present invention also aims at providing a waterproof cap for preventing water from penetrating from an insertion port of a housing of an electronic device.

A connector assembly according to the present invention comprises:

- a connector fitted to a counter connector along a fitting direction;
- a housing of an electronic device, the housing accommodating the connector and having an insertion port into which the counter connector is inserted; and
- a waterproof cap detachably attached from an outside of the housing to the housing and used to close the insertion port, the waterproof cap including:

- a cap body extending in the fitting direction,
- a first protruding portion disposed on an outer peripheral surface of the cap body, continuously surrounding an entire periphery of the outer peripheral surface while protruding from the outer peripheral surface in a plane orthogonal to the fitting direction, and made of an elastic material; and
- a second protruding portion disposed on the outer peripheral surface on a front end side of the cap body in the fitting direction from a position at which the first protruding portion is disposed, protruding from the outer peripheral surface in a direction orthogonal to the fitting direction, and made of an elastic material,
- wherein when the waterproof cap is attached to the housing, the first protruding portion is press-fitted to the insertion port of the housing and contacts an entire periphery of an inner peripheral surface of the insertion port while being elastically compressed, and the second protruding portion is inserted into the connector and contacts at least two inner surfaces of the connector facing each other while being elastically compressed.

A waterproof cap according to the present invention is one that is detachably attached from an outside of a housing of an electronic device to the housing and closes an insertion port, the housing accommodating a connector fitted to a counter connector along a fitting direction and having the insertion port into which the counter connector is inserted, the waterproof cap comprises:

a cap body extending in the fitting direction, a first protruding portion disposed on an outer peripheral surface of the cap body, continuously surrounding an entire periphery of the outer peripheral surface while protruding from the outer peripheral surface in a plane orthogonal to the fitting direction, and made of an elastic material; and a second protruding portion disposed on the outer peripheral surface on a front end side of the cap body in the fitting direction from a position at which the first protruding portion is disposed, protruding from the outer peripheral surface in a direction orthogonal to the fitting direction, and made of an elastic member, wherein when the waterproof cap is attached to the housing, the first protruding portion is press-fitted to the insertion port of the housing and contacts an entire periphery of an inner peripheral surface of the insertion port while being elastically compressed, and the second protruding portion is inserted into the connector and contacts at least two inner surfaces of the connector facing each other while being elastically compressed.

DETAILED DESCRIPTION OF THE INVENTION

Embodiments of the present invention are described below with reference to the accompanying drawings.

Embodiment 1

Figure 1:
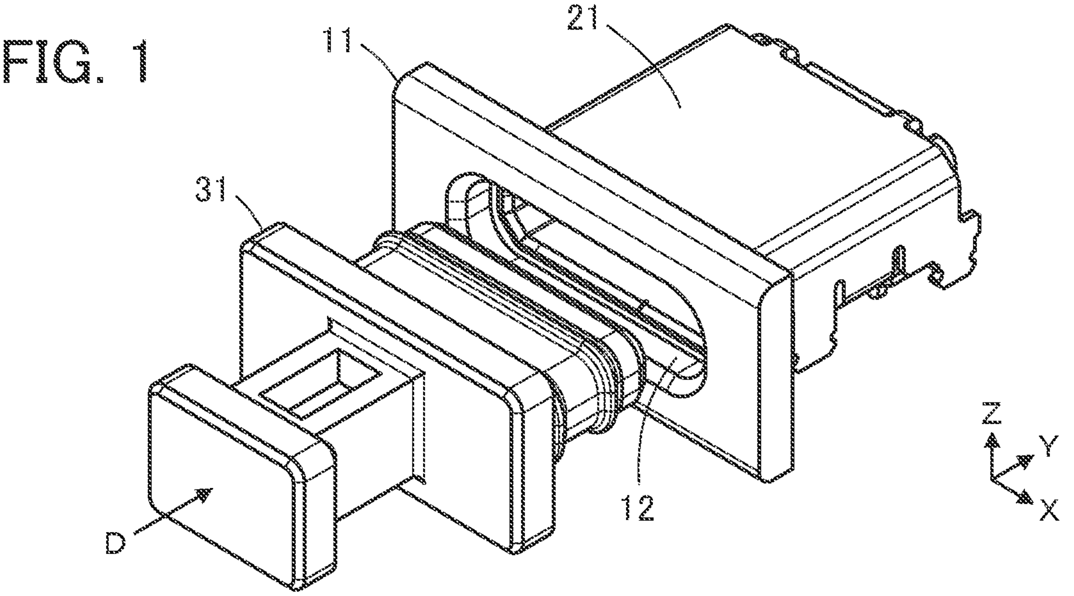
FIG. 1 is a perspective view showing a connector assembly according to Embodiment 1 of the present invention.

FIG. 1 shows a perspective view of a connector assembly according to Embodiment 1. The connector assembly includes a housing 11 of an electronic device, a connector 21 accommodated in the housing 11, and a waterproof cap 31 detachably attached to the housing 11.

The housing 11 of the electronic device is provided with an insertion port 12 of oval shape extending in a predetermined direction, and the connector 21 is disposed at a position facing the insertion port 12 from the inside of the housing 11. In addition, the connector 21 is to be fitted with a counter connector (not shown) along a fitting direction D, and the counter connector is inserted from the outside of the housing 11 into the housing 11 through the insertion port 12 to be fitted with the connector 21. Note that part of the housing 11, at which part the insertion port 12 is provided, extends in a direction orthogonal to the fitting direction D.

When a counter connector (not shown) is not fitted with the connector 21 and the connector 21 is not used, the waterproof cap 31 is attached to the housing 11 from the outside of the housing 11 to close the insertion port 12 in order to prevent water from entering the inside of the housing 11 through the insertion port 12.

For convenience, the direction in which a counter connector (not shown) is fitted with the connector 21 along the fitting direction D is referred to as "+Y direction," the direction orthogonal to the Y direction and in which the insertion port 21 of oval shape of the housing 11 extends is referred to as "X direction," and the direction perpendicular to an XY plane is referred to as "Z direction."

Figure 2:
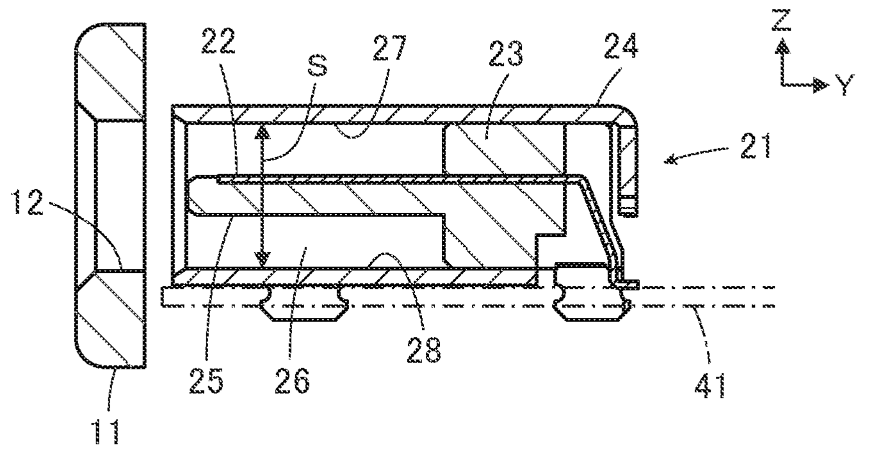
FIG. 2 is a cross-sectional side view showing part of a housing of an electronic device and a connector that are used in Embodiment 1.

As shown in FIG. 2, the connector 21 is mounted on a circuit board 41 disposed in the housing 11 of the electronic device, and includes at least one connection terminal 22, an insulator 23 that retains the connection terminal 22, and a metal shell 24 that encloses the connection terminal 22 and the insulator 23.

The insulator 23 includes a tongue portion 25 projecting in the −Y direction along the fitting direction D, and a −Y directional end portion of the connection terminal 22 is disposed on a surface of the tongue portion 25 and exposed in the +Z direction. A +Y directional end portion of the connection terminal 22 projects in the +Y direction from the insulator 23 and is connected to a connection pad (not shown) disposed on a surface of the circuit board 41, and a Y directional center portion of the connection terminal 22 is embedded in the insulator 23.

The metal shell 24 has a tubular shape and forms a counter connector accommodating portion 26 of recess shape around the tongue portion 25 of the insulator 23. The counter connector accommodating portion 26 is a space for accommodating part of a counter connector (not shown) when the counter connector is fitted with the connector 21 along the fitting direction D.

The connector 21 is disposed on the +Y direction side of and near the insertion port 12 of the housing 11, and the counter connector accommodating portion 26 of the metal shell 24 is disposed to face the insertion portion 12 of the housing 11 from the inside of the housing 11.

Note that the metal shell 24 of tubular shape has a pair of inner surfaces 27 and 28 facing each other in the Z direction with the counter connector accommodating portion 26 being sandwiched therebetween, and these inner surfaces 27 and 28 are disposed with a gap S therebetween in the Z direction.

Figure 3:
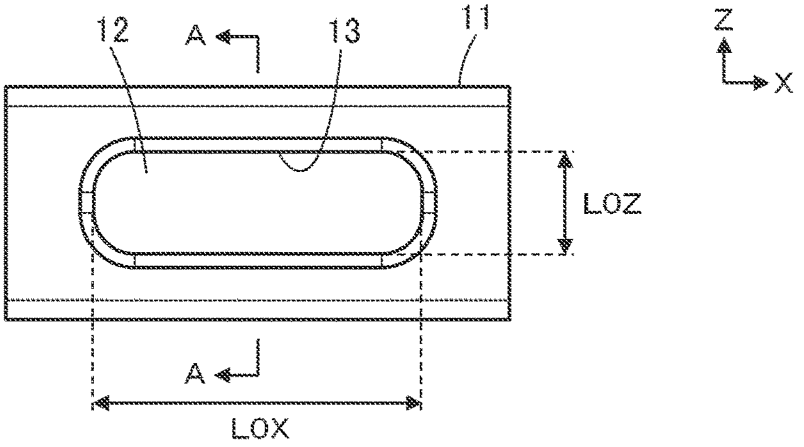
FIG. 3 is a front view showing part of the housing of the electronic device used in Embodiment 1.

As shown in FIG. 3, the insertion port 12 of the housing 11 has an inner peripheral surface 13 of oval shape having an X directional length of LOX and a Z directional length of L0Z.

Figure 4:
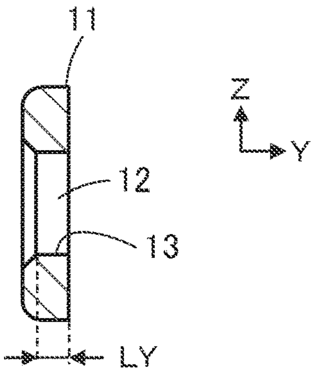
FIG. 4 is a cross-sectional view taken along line A-A in FIG. 3.

In addition, as shown in FIG. 4, the inner peripheral surface 13 of the insertion port 12 has a predetermined length LY along the Y direction.

Figure 5:
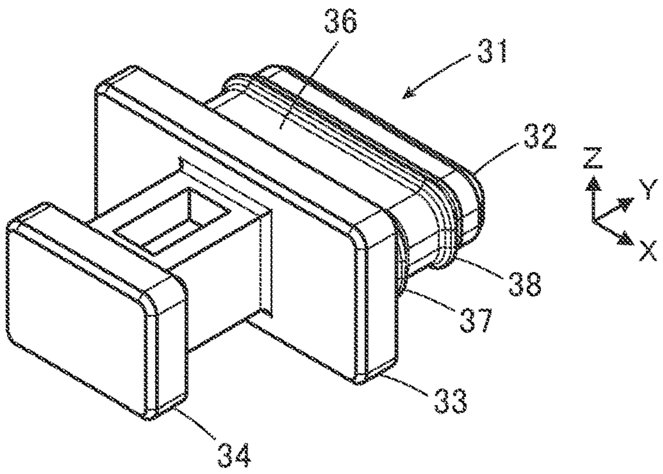
FIG. 5 is a perspective view showing a waterproof cap used in Embodiment 1 when viewed obliquely from the rear.
Figure 6:
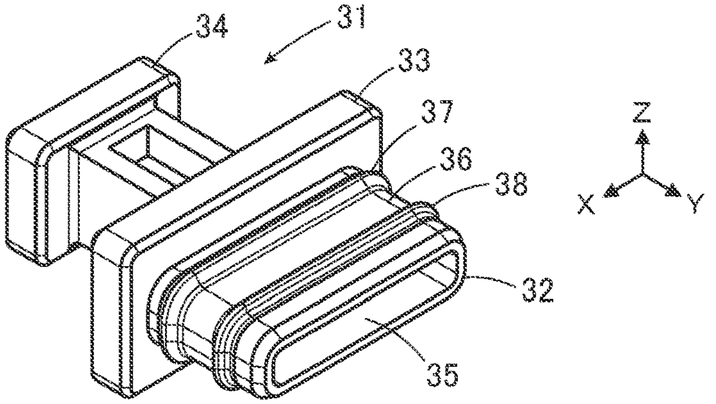
FIG. 6 is a perspective view showing the waterproof cap used in Embodiment 1 when viewed obliquely from the front.

The structure of the waterproof cap 31 is shown in FIGS. 5 and 6. The waterproof cap 31 includes a cap body 32 extending in the Y direction, a flange portion 33 joined to a −Y directional end portion, that is, a rear end, of the cap body 32, and further a knob portion 34 joined to a rear end of the flange portion 33.

The cap body 32 has a flattened oval shape corresponding to the insertion port 12 of oval shape of the housing 11 and extending in the X direction when viewed in the Y direction, and is provided in its interior with a recessed portion 35 recessed from a +Y directional end portion, that is, a front end, of the cap body 32 to a rear portion of the cap body 32.

An elastic member 36 is attached to the cap body 32 so as to continuously surround an entire periphery of an outer peripheral surface of the cap body 32. The elastic member 36 includes a first protruding portion 37 situated at a rear portion on the −Y direction side of the cap body 32, and a second protruding portion 38 situated on the +Y directional-end-portion side of the cap body 32 from the first protruding portion 37. The first protruding portion 37 and the second protruding portion 38 both continuously surround the entire periphery of the outer peripheral surface of the cap body 32 while protruding from the outer peripheral surface of the cap body 32 toward the outside of the cap body 32 in an XZ plane orthogonal to the Y direction, and are integrally formed.

Figure 7:
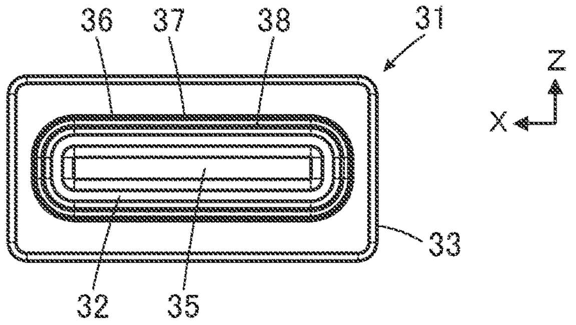
FIG. 7 is a front view showing the waterproof cap used in Embodiment 1.

As shown in FIG. 7, the flange portion 33 extends longer than the cap body 32 in the X direction and the Z direction in an XZ plane orthogonal to the Y direction. The flange portion 33 defines a position of the waterproof cap 31 in the Y direction with respect to the housing 11 by abutting an outer surface of the housing 11 when the cap body 32 is inserted into the insertion port 12 of the housing 11 and the waterproof cap 31 is attached to the housing 11 from the outside of the housing 11.

Figure 8:
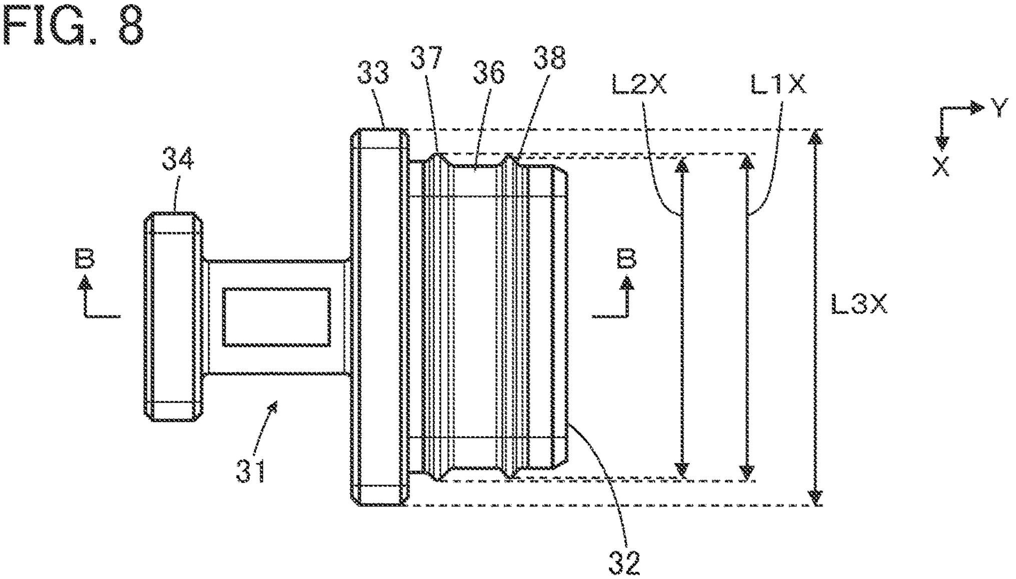
FIG. 8 is a plan view showing the waterproof cap used in Embodiment 1.

As shown in FIG. 8, when viewed in the Z direction, a maximum distance L1X between opposite ends of the first protruding portion 37 continuously surrounding the entire periphery of the outer peripheral surface of the cap body 32 is set to be larger than a maximum distance L2X between opposite ends of the second protruding portion 38 continuously surrounding the entire periphery of the outer peripheral surface of the cap body 32.

In addition, when viewed in the Z direction, a maximum dimension L3X of the flange portion 33 is set to be larger than the maximum distance L1X between the opposite ends of the first protruding portion 37 continuously surrounding the entire periphery of the outer peripheral surface of the cap body 32.

Figure 9:
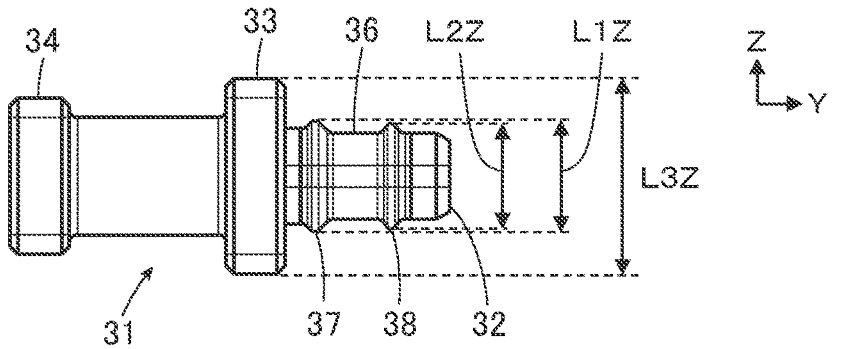
FIG. 9 is a side view showing the waterproof cap used in Embodiment 1.

Similarly, as shown in FIG. 9, when viewed in the X direction, a maximum distance L1Z between opposite ends of the first protruding portion 37 continuously surrounding the entire periphery of the outer peripheral surface of the cap body 32 is set to be larger than a maximum distance L2Z between opposite ends of the second protruding portion 38 continuously surrounding the entire periphery of the outer peripheral surface of the cap body 32.

In addition, when viewed in the X direction, a maximum dimension L3Z of the flange portion 33 is set to be larger than the maximum distance L1Z between the opposite ends of the first protruding portion 37 continuously surrounding the entire periphery of the outer peripheral surface of the cap body 32.

Note that there is a relation in that the X directional length LOX of the inner peripheral surface 13 of the insertion port 12 of the housing 11 shown in FIG. 3 is larger than the maximum distance L2X between the opposite ends of the second protruding portion 38, slightly smaller than the maximum distance L1X between the opposite ends of the first protruding portion 37, and smaller than the maximum dimension L3X of the flange portion 33.

Similarly, there is a relation in that the Z directional length L0Z of the inner peripheral surface 13 of the insertion port 12 of the housing 11 shown in FIG. 3 is larger than the maximum distance L2Z between the opposite ends of the second protruding portion 38, slightly smaller than the maximum distance L1Z between the opposite ends of the first protruding portion 37, and smaller than the maximum dimension L3Z of the flange portion 33.

Since the X directional length LOX and the Z directional length L0Z of the inner peripheral surface 13 of the insertion port 12 are respectively slightly smaller than the maximum distances L1X and LIZ between the opposite ends of the first protruding portion 37, when the first protruding portion 37 disposed on the outer peripheral surface of the cap body 32 is press-fitted to the insertion port 12 of the housing 11 in the Y direction, the first protruding portion 37 can contact the entire periphery of the inner peripheral surface 13 of the insertion port 12 while being elastically compressed.

The gap S between the pair of inner surfaces 27 and 28 facing each other in the Z direction with the counter connector accommodating portion 26 of the metal shell 24 being sandwiched therebetween as shown in FIG. 2 is set to be slightly smaller than the maximum distance L2Z between the opposite ends of the second protruding portion 38 when viewed in the X direction. Thus, when the +Y directional end portion of the cap body 32 is inserted into the counter connector accommodating portion 26 of the metal shell 24, the second protruding portion 38 can contact the pair of inner surfaces 27 and 28 of the metal shell 24 while being elastically compressed.

The knob portion 34 joined to the rear end of the flange portion 33 is to be held by a user when the waterproof cap 31 is attached to the housing 11 and when the waterproof cap 31 attached to the housing 11 is pulled out.

The cap body 32, the flange portion 33, and the knob portion 34 of the waterproof cap 31 as above are integrally formed from an insulating resin, and the elastic member 36 including the first protruding portion 37 and the second protruding portion 38 is made of a rubber material that is an elastic material.

Figure 10:
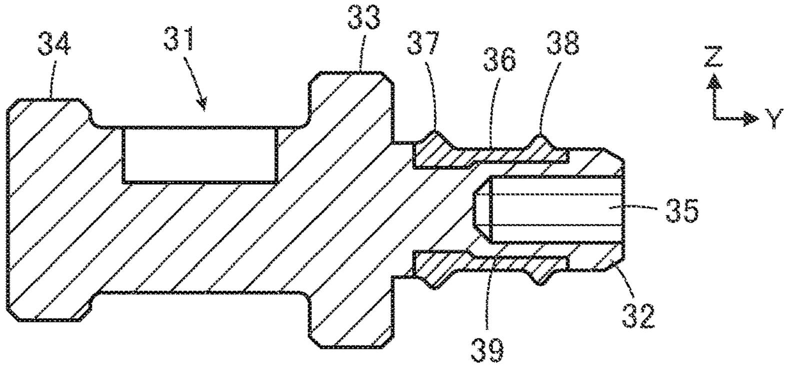
FIG. 10 is a cross-sectional view taken along line B-B in FIG. 8.

As shown in FIG. 10, a groove 39 is formed at the outer peripheral surface of the cap body 32 so as to continuously surround the entire periphery of the outer peripheral surface, and the elastic member 36 is fitted or molded in the groove 39 to be thereby attached to the cap body 32.

Note that the recessed portion 35 of the cap body 32 is disposed at a position where the recessed portion 35 overlaps the second protruding portion 38 of the elastic member 36 in the Y direction.

Figure 11:
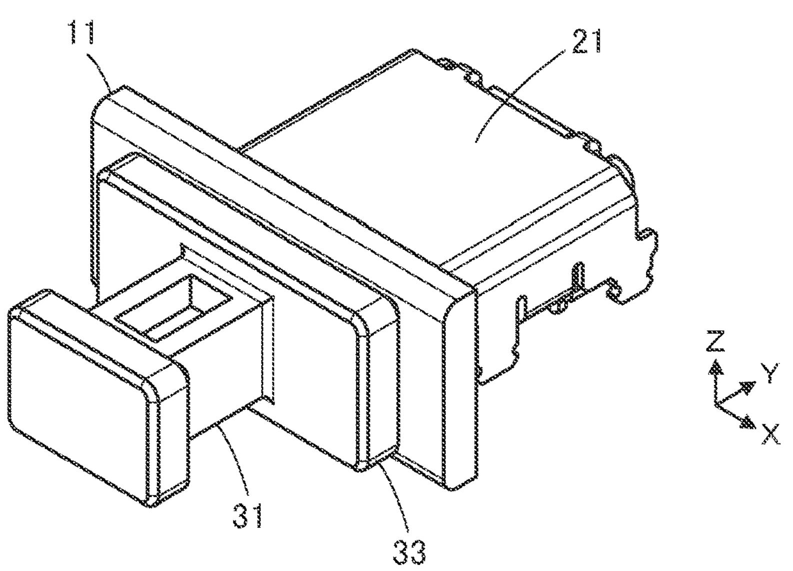
FIG. 11 is a perspective view showing the connector assembly according to Embodiment 1 with the waterproof cap being attached to the housing of the electronic device.

Next, the connector assembly in a state where the waterproof cap 31 is attached to the housing 11 is shown in FIG. 11. The waterproof cap 31 is attached to the housing 11 from the outside of the housing 11 along the Y direction, the flange portion 33 of the waterproof cap 31 abuts the outer surface of the housing 11, and the insertion port 12 of the housing 11 is covered with the flange portion 33 and cannot be seen from the outside of the housing 11.

Figure 12:
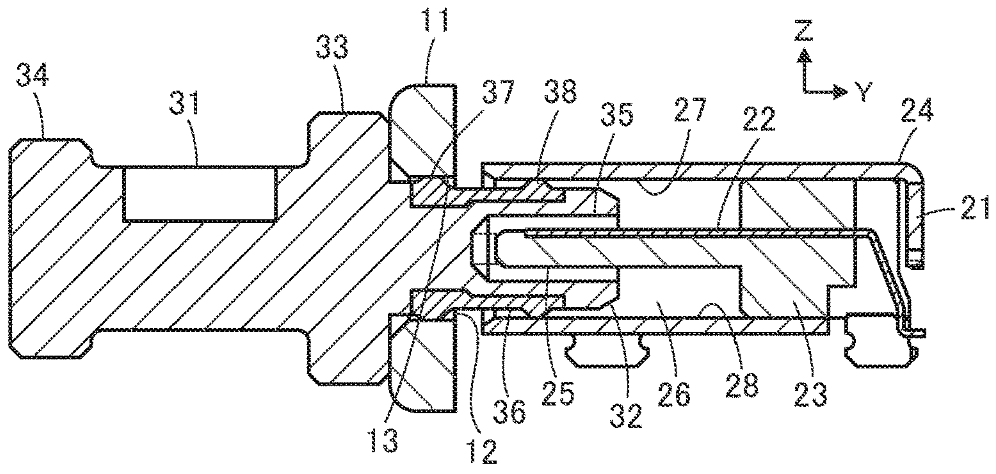
FIG. 12 is a cross-sectional side view showing the connector assembly according to Embodiment 1 with the waterproof cap being attached to the housing of the electronic device.

At this time, as shown in FIG. 12, the cap body 32 of the waterproof cap 31 is inserted into the insertion port 12 of the housing 11, and the first protruding portion 37 of the elastic member 36 disposed on the outer peripheral surface of the cap body 32 is press-fitted to the insertion port 12. Since the X directional length LOX and the Z directional length L0Z of the inner peripheral surface 13 of the insertion port 12 are respectively slightly smaller than the maximum distances L1X and L1Z between the opposite ends of the first protruding portion 37, the first protruding portion 37 contacts the entire periphery of the inner peripheral surface 13 of the insertion port 12 while being elastically compressed, thereby preventing water from entering the inside of the housing 11 through the insertion port 12.

Since the inner peripheral surface 13 of the insertion port 12 has the predetermined length LY along the Y direction as shown in FIG. 4, the first protruding portion 37 contacts the inner peripheral surface 13 of the insertion port 12 in the range of this length LY, thereby preventing water from entering. In other words, even if the flange portion 33 of the waterproof cap 31 does not abut the outer surface of the housing 11, when the first protruding portion 37 contacts the inner peripheral surface 13 of the insertion port 12 in the range of the predetermined length LY, a waterproof effect can be obtained, and reliable waterproofness can be provided.

As shown in FIG. 12, when the waterproof cap 31 is attached to the housing 11, the +Y directional end portion, that is, the front end, of the cap body 32 is inserted to the inside of the counter connector accommodating portion 26 of the metal shell 24 of the connector 21 disposed inside the housing 11.

At this time, since the recessed portion 35 recessed from the front end of the cap body 32 to the rear end of the cap body 32 is formed inside the cap body 32, the tongue portion 25 projecting in the −Y direction in the counter connector accommodating portion 26 of the connector 21 and the −Y directional end portion of the connection terminal 22 disposed on the surface of the tongue portion 25 are accommodated in the recessed portion 35 of the cap body 32. Therefore, the waterproof cap 31 can be attached to the housing 11 while the front end of the cap body 32 does not abut the tongue portion 25 and the connection terminal 22.

Note that the recessed portion 35 of the cap body 32 is formed to have a size such that the recessed portion 35 faces the tongue portion 25 and the −Y directional end portion of the connection terminal 22 that are accommodated inside the recessed portion 35 across a gap in each of the Y direction, the Z direction, and the X direction, and does not contact the tongue portion 25 and the connection terminal 22.

In addition, the front end of the cap body 32 is inserted to the inside of the counter connector accommodating portion 26 of the metal shell 24, whereby the second protruding portion 38, situated on the front end side of the cap body 32, of the elastic member 36 disposed on the outer peripheral surface of the cap body 32 is also inserted to the inside of the counter connector accommodating portion 26.

Here, since the gap S between the pair of inner surfaces 27 and 28, facing each other in the Z direction, of the metal shell 24 is set to be slightly smaller than the maximum distance L2Z between the opposite ends of the second protruding portion 38 when viewed in the X direction, the second protruding portion 38 contacts the inner surfaces 27 and 28 of the metal shell 24 while being elastically compressed and receives a pressing force from the inner surfaces 27 and 28 of the metal shell 24.

Therefore, a holding force of the waterproof cap 31 to hold the housing 11 is improved, and the waterproof cap 31 can be effectively prevented from falling off the housing 11.

Further, since the second protruding portion 38 contacts the pair of inner surfaces 27 and 28 of the metal shell 24 of the connector 21, a connector assembly that has a simple configuration without forming a dedicated part or portion for receiving the second protruding portion 38 and does not require a large space can be achieved.

When a counter connector (not shown) is connected to the connector 21 in the state where the waterproof cap 31 is attached to the housing 11 so that water is prevented from entering the inside of the housing 11 through the insertion portion 12, the knob portion 34 of the waterproof cap 31 is held, and the waterproof cap 31 is pulled out from the housing 11 toward the −Y direction, whereby the insertion port 12 is released. Therefore, the counter connector can be fitted with the connector 21 disposed inside the housing 11 through the insertion port 12.

While in Embodiment 1 above, the second protruding portion 38 of the waterproof cap 31 contacts the pair of inner surfaces 27 and 28, facing each other in the Z direction, of the metal shell 24 of the connector 21, the invention is not limited thereto, and for example, the second protruding portion 38 may be configured to contact a pair of inner surfaces 27 and 28, facing each other in the X direction, of the metal shell 24 of the connector 21.

It suffices if the second protruding portion 38 of the waterproof cap 31 contacts at least two surfaces, facing each other, of the metal shell 24 while being elastically compressed. In addition, the second protruding portion 38 is not necessarily required to contact the metal shell 24, and when the second protruding portion 38 contacts at least two surfaces, facing each other, of the inside of the connector 21, the holding force of the waterproof cap 31 can similarly be improved.

Since in Embodiment 1 above, the second protruding portion 38 of the waterproof cap 31 continuously surrounds the entire periphery of the outer peripheral surface of the cap body 32 while protruding from the outer peripheral surface of the cap body 32 toward the outside of the cap body 32, the second protruding portion 38 may be configured to contact not only the pair of inner surfaces 27 and 28 of the metal shell 24 but also the entire periphery of the inner peripheral surface of the metal shell 24 while being elastically compressed. Therefore, the holding force of the waterproof cap 31 is further improved.

In addition, when the second protruding portion 38 of the waterproof cap 31 contacts only the pair of the inner surfaces 27 and 28, facing each other in the Z direction, of the metal shell 24, the second protruding portion 38 need not continuously surround the entire periphery of the outer peripheral surface of the cap body 32, and even with the second protruding portion formed only at portions, facing the +Z direction and the −Z direction, of the outer peripheral surface of the cap body 32, the holding force of the waterproof cap 31 can similarly be improved.

In addition, while the connector 21 has only the connection terminal 22 disposed on the +Z direction side surface of the tongue portion 25, the connection terminal 22 may be disposed on each of the +Z direction side surface and a −Z direction side surface of the tongue portion 25. Even in an electronic device in which the connector as above is disposed inside the housing 11, the waterproof cap 31 is attached to the housing 11, thereby preventing water from entering the inside of the housing 11 through the insertion port 12.

Embodiment 2

While in Embodiment 1 above, the elastic member 36 in which the first protruding portion 37 and the second protruding portion 38 are integrally formed is attached to the outer peripheral surface of the cap body 32 of the waterproof cap 31, the invention is not limited thereto.

Figure 13:
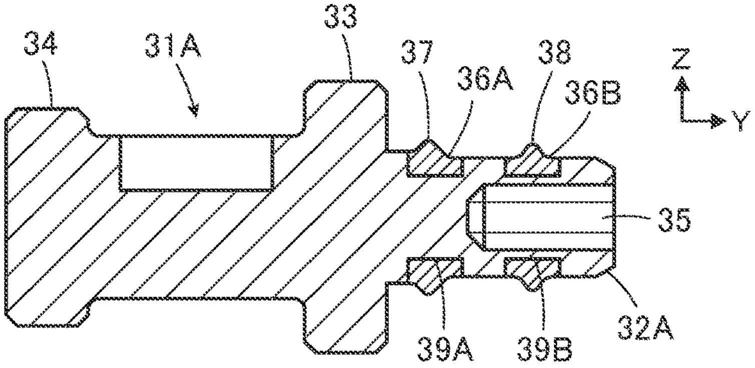
FIG. 13 is a cross-sectional side view showing a waterproof cap used in Embodiment 2.
Figure 14:
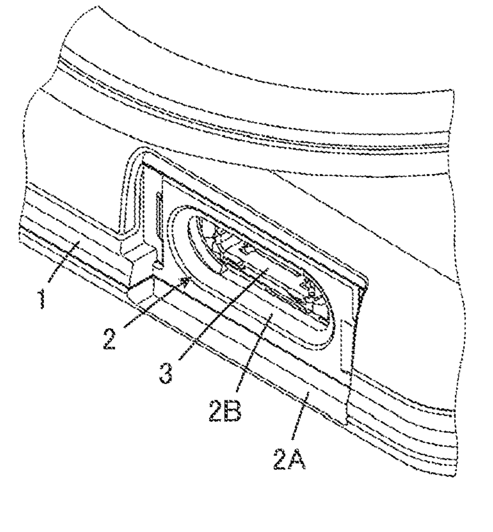
FIG. 14 PRIOR ART
FIG. 14 is a partial perspective view showing a housing of a conventional mobile terminal.
Figure 15:
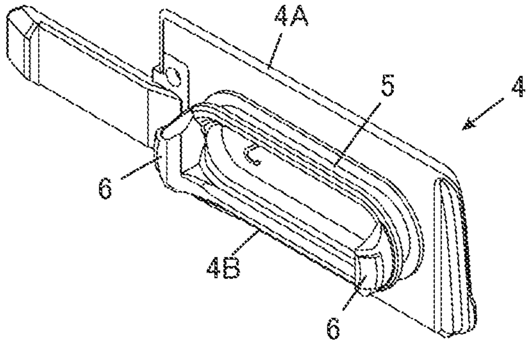
FIG. 15 PRIOR ART
FIG. 15 is a perspective view showing a lid member used in the conventional mobile terminal.
Figure 16:
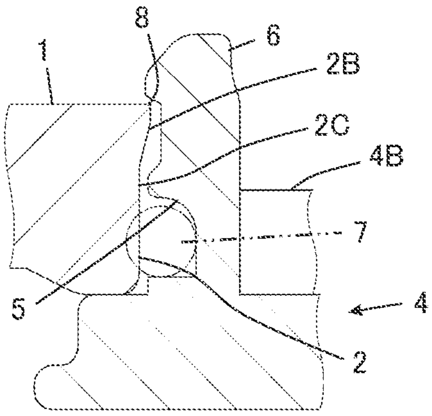
FIG. 16 PRIOR ART
FIG. 16 is a partial cross-sectional view showing a state where the lid member is attached to the housing of the conventional mobile terminal.

FIG. 13 is a cross-sectional view of a waterproof cap 31A used in a connector assembly according to Embodiment 2. The waterproof cap 31A includes a cap body 32A instead of the cap body 32 in the waterproof cap 31 used in Embodiment 1, and instead of the elastic member 36, a first elastic member 36A and a second elastic member 36B are attached to the cap body 32A. The waterproof cap 31A otherwise has the same configuration as the waterproof cap 31 in Embodiment 1.

The cap body 32A is provided with a first groove 39A continuously surrounding an entire periphery of an outer peripheral surface of a rear portion, close to the flange portion 33, of the cap body 32A, and a second groove 39B continuously surrounding an entire periphery of an outer peripheral surface of the cap body 32A at a position of a +Y direction end portion side of the cap body 32A from the first groove 39A.

The first elastic member 36A has a first protruding portion 37, is made of a rubber material, and is attached to the cap body 32A by being fitted in the first groove 39A. Similarly, the second elastic member 36B has a second protruding portion 38, is made of a rubber material, and is attached to the cap body 32A by being fitted in the second groove 39B.

Even when the first protruding portion 37 and the second protruding portion 38 are respectively formed at the dedicated first elastic member 36A and the dedicated second elastic member 36B as described above, as with Embodiment 1, water can be prevented from entering the inside of the housing 11 through the insertion port 12 of the housing 11, and a holding force of the waterproof cap 31A can be improved, and a connector assembly which has a simple configuration and does not require a large space can be achieved.

While the cap body 32, the flange portion 33, and the knob portion 34 of the waterproof cap 31 in Embodiment 1 above as well as the cap body 32A, the flange portion 33, and the knob portion 34 of the waterproof cap 31A in Embodiment 2 are made of an insulating resin, these members are configured not to directly contact the connection terminal 22 and the metal shell 24 of the connector 21 and thus can be made of a material having conductivity such as metal.

What is claimed is:

1. A connector assembly comprising:

a connector fitted to a counter connector along a fitting direction;

a housing of an electronic device, the housing accommodating the connector and having an insertion port into which the counter connector is inserted; and a waterproof cap detachably attached from an outside of the housing to the housing and used to close the insertion port, the waterproof cap including:

a cap body extending in the fitting direction, a first protruding portion disposed on an outer peripheral surface of the cap body, continuously surrounding an entire periphery of the outer peripheral surface while protruding from the outer peripheral surface in a plane orthogonal to the fitting direction, and made of an elastic material; and a second protruding portion disposed on the outer peripheral surface on a front end side of the cap body in the fitting direction from a position at which the first protruding portion is disposed, protruding from the outer peripheral surface in a direction orthogonal to the fitting direction, and made of an elastic material, wherein when the waterproof cap is attached to the housing, the first protruding portion is press-fitted to the insertion port of the housing and contacts an entire periphery of an inner peripheral surface of the insertion port while being elastically compressed, and the second protruding portion is inserted into the connector and contacts at least two inner surfaces of the connector facing each other while being elastically compressed.

2. The connector assembly according to claim 1, wherein the connector has at least one connection terminal connected to a connection terminal of the counter connector when fitted with the counter connector, and wherein the cap body includes a recessed portion recessed from the front end of the cap body toward a rear portion of the cap body and accommodating the at least one connection terminal of the connector.

3. The connector assembly according to claim 1, wherein the connector includes a fitting member in which a counter connector accommodating portion of recess shape for accommodating the counter connector is formed, and wherein when the waterproof cap is attached to the housing, the second protruding portion is inserted into the counter connector accommodating portion of the fitting member and contacts at least two surfaces of the fitting member facing each other while being elastically compressed.

4. The connector assembly according to claim 3, wherein the fitting member is made of a metal shell.

5. A waterproof cap that is detachably attached from an outside of a housing of an electronic device to the housing and closes an insertion port, the housing accommodating a connector fitted to a counter connector along a fitting direction and having the insertion port into which the counter connector is inserted, the waterproof cap comprising:

a cap body extending in the fitting direction, a first protruding portion disposed on an outer peripheral surface of the cap body, continuously surrounding an entire periphery of the outer peripheral surface while protruding from the outer peripheral surface in a plane orthogonal to the fitting direction, and made of an elastic material; and a second protruding portion disposed on the outer peripheral surface on a front end side of the cap body in the fitting direction from a position at which the first protruding portion is disposed, protruding from the outer peripheral surface in a direction orthogonal to the fitting direction, and made of an elastic member, wherein when the waterproof cap is attached to the housing, the first protruding portion is press-fitted to the insertion port of the housing and contacts an entire periphery of an inner peripheral surface of the insertion port while being elastically compressed, and the second protruding portion is inserted into the connector and contacts at least two inner surfaces of the connector facing each other while being elastically compressed.

6. The waterproof cap according to claim 5, wherein the cap body includes a recessed portion recessed from the front end of the cap body toward a rear portion of the cap body.

7. The waterproof cap according to claim 6, wherein the recessed portion is disposed at a position where the recessed portion overlaps the second protruding portion in the fitting direction.

8. The waterproof cap according to claim 5, wherein the cap body is made of an insulating resin, and wherein the first protruding portion and the second protruding portion are each made of a rubber material.

9. The waterproof cap according to claim 8, comprising an elastic member in which the first protruding portion and the second protruding portion are integrally formed.

10. The waterproof cap according to claim 8, comprising a first elastic member in which the first protruding portion is formed, and a second elastic member which is separated from the first elastic member and in which the second protruding portion is formed.

11. The waterproof cap according to claim 5, wherein the second protruding portion continuously surrounds the entire periphery of the outer peripheral surface of the cap body while protruding from the outer peripheral surface of the cap body in a plane orthogonal to the fitting direction.

12. The waterproof cap according to claim 11, wherein when viewed in a direction orthogonal to the fitting direction, a maximum distance between opposite ends of the first protruding portion continuously surrounding the entire periphery of the outer peripheral surface of the cap body is larger than a maximum distance between opposite ends of the second protruding portion continuously surrounding the entire periphery of the outer peripheral surface of the cap body.

13. The waterproof cap according to claim 5, comprising a flange portion joined to a rear end of the cap body along the fitting direction and extending longer than the cap body in a direction orthogonal to the fitting direction.

14. The waterproof cap according to claim 13, wherein when viewed in a direction orthogonal to the fitting direction, a maximum dimension of the flange portion is larger than a maximum distance between opposite ends of the first protruding portion continuously surrounding the entire periphery of the outer peripheral surface of the cap body.

15. The waterproof cap according to claim 13, comprising a knob portion joined to a rear end of the flange portion along the fitting direction.

* * * * *